(12) United States Patent
Tsukada et al.

(10) Patent No.: US 7,407,462 B2
(45) Date of Patent: Aug. 5, 2008

(54) SHIFT CONTROLLER FOR A CONTINUOUSLY VARIABLE TRANSMISSION

(75) Inventors: Yoshiaki Tsukada, Saitama (JP); Hiroyuki Kojima, Saitama (JP); Takashi Ozeki, Saitama (JP); Hiroaki Uchisasai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 233 days.

(21) Appl. No.: 11/189,469

(22) Filed: Jul. 26, 2005

(65) Prior Publication Data

US 2006/0030452 A1    Feb. 9, 2006

(30) Foreign Application Priority Data

Aug. 5, 2004   (JP) ............................. 2004-229415

(51) Int. Cl.
*F16H 59/06*   (2006.01)
*B60K 6/00*   (2007.10)

(52) U.S. Cl. ............................... 477/3; 477/37; 477/44; 903/945

(58) Field of Classification Search ............... 477/3, 477/44, 37, 7, 15; 701/22, 51, 55; 903/930, 903/945, 903, 908, 943, 944; 180/65.2–65.4
See application file for complete search history.

(56) References Cited

U.S. PATENT DOCUMENTS

| | | | |
|---|---|---|---|
| 6,459,980 B1 * | 10/2002 | Tabata et al. | 701/70 |
| 6,867,509 B1 * | 3/2005 | Takaoka et al. | 290/40 A |
| 2004/0254047 A1 * | 12/2004 | Frank et al. | 477/37 |
| 2005/0088139 A1 * | 4/2005 | Frank | 320/104 |
| 2005/0103544 A1 * | 5/2005 | Takami et al. | 180/65.2 |

FOREIGN PATENT DOCUMENTS

JP    2004-116672    4/2004

* cited by examiner

*Primary Examiner*—Sherry Estremsky
(74) *Attorney, Agent, or Firm*—Carrier Blackman & Associates, P.C.; William D. Blackman; Joseph P. Carrier (57) ABSTRACT

A shift control apparatus for a continuously variable transmission includes a continuously variable transmission for transmitting power of an engine to a driving wheel; a shift actuator for changing a gear ratio of the continuously variable transmission; and a gear ratio controller for controlling the shift actuator such that the gear ratio of the continuously variable transmission exhibits a predetermined shift pattern. The shift controller further includes a battery monitor for detecting remaining charge of a battery charged by a generator connected to the engine, and the shift pattern is changed according to the remaining charge of the battery. The shift control apparatus ensures an operating feel similar to that during ordinary running regardless of remaining charge of a battery. A method of controlling a continuously variable transmission in a vehicle is also disclosed.

16 Claims, 9 Drawing Sheets

7: Control unit
7a: Speed ratio control portion
7b: Battery monitoring portion
7c: First shift pattern | Second shift pattern
54b: Fan
40: Starting clutch
20: Engine
21a: ACG starter motor
77: Shift motor
23: Continuously variable transmission
21b: Driving motor
44: One-way clutch
69: Reduction mechanism
74: Battery
WR: Rear wheel

(Ne) Engine speed
(V) Vehicle speed
5-A: Low ratio control range
5-B: Shift control range
5-C: Top ratio control range
(R) Gear ratio

FIG. 6

6-A: Shift pattern control

S1: Detect remaining charge M of battery

S2: Is vehicle stationary?

S4: Second pattern?

S5: Change shift pattern (from first to second)

S6: First pattern?

S7: Change shift pattern (from second to first)

6-B: Return

FIG. 7

(Ne) Engine speed
(V) Vehicle speed
7-A: Low ratio control range
7-B: Shift control range
7-C: Top ratio control range
(R) Gear ratio

FIG. 8

SHIFT CONTROLLER FOR A CONTINUOUSLY VARIABLE TRANSMISSION

CROSS-REFERENCE TO RELATED APPLICATIONS

The present application claims priority under 35 USC 119 based on Japanese patent Application No. 2004-229415, filed Aug. 5, 2004. The subject matter of this priority document is incorporated by reference herein.

BACKGROUND OF THE INVENTION

1. Field of the Invention

The present invention relates to a shift controller for a continuously variable transmission. More specifically, the present invention relates to a shift controller for a continuously variable transmission including a shift actuator that changes a gear ratio regardless of engine speed.

2. Description of the Background Art

There are many known hybrid vehicles. An electric vehicle powered by a motor offers the advantage of no air pollution, reduced noise pollution, and better response to acceleration and deceleration needs as compared with conventional vehicles powered by engines. A hybrid vehicle mounted with a motor and an engine has been put into practical use as an embodiment having these benefits.

Three types of such a hybrid vehicle are generally known: a "series hybrid system," a "parallel hybrid system," and a "series-parallel combined system." Specifically, the series hybrid system is powered solely by the motor, with the engine being used for generating electricity for recharging a battery. The parallel hybrid system uses both the motor and the engine to drive the vehicle, each being used according to a running condition and the like. The series-parallel combined system uses the foregoing two systems, one being selected for use appropriately according to the running condition.

In many of these hybrid vehicles, a belt-type continuously variable transmission is adopted as an automatic transmission. The belt-type continuously variable transmission includes a driving side pulley, a driven side pulley, and an endless belt. The driving side pulley is connected to an output shaft of a power source. The driven side pulley is connected to a driving shaft. The endless belt is wound around the driving side pulley and the driven side pulley. The gear ratio is changed by displacing a radius of the driving side pulley using a centrifugal force generated by rotation of the output shaft.

Japanese Patent Laid-open No. 2004-116672 discloses an electronically controlled belt-type continuously variable transmission in the place of a conventional belt-type continuously variable transmission. The electronic controlled belt-type continuously variable transmission includes a separate shift actuator that displaces the radius of the driving side pulley called an electronic belt converter. The electronic belt converter is capable of arbitrarily controlling its gear ratio regardless of the speed of the output shaft.

Figure 9:
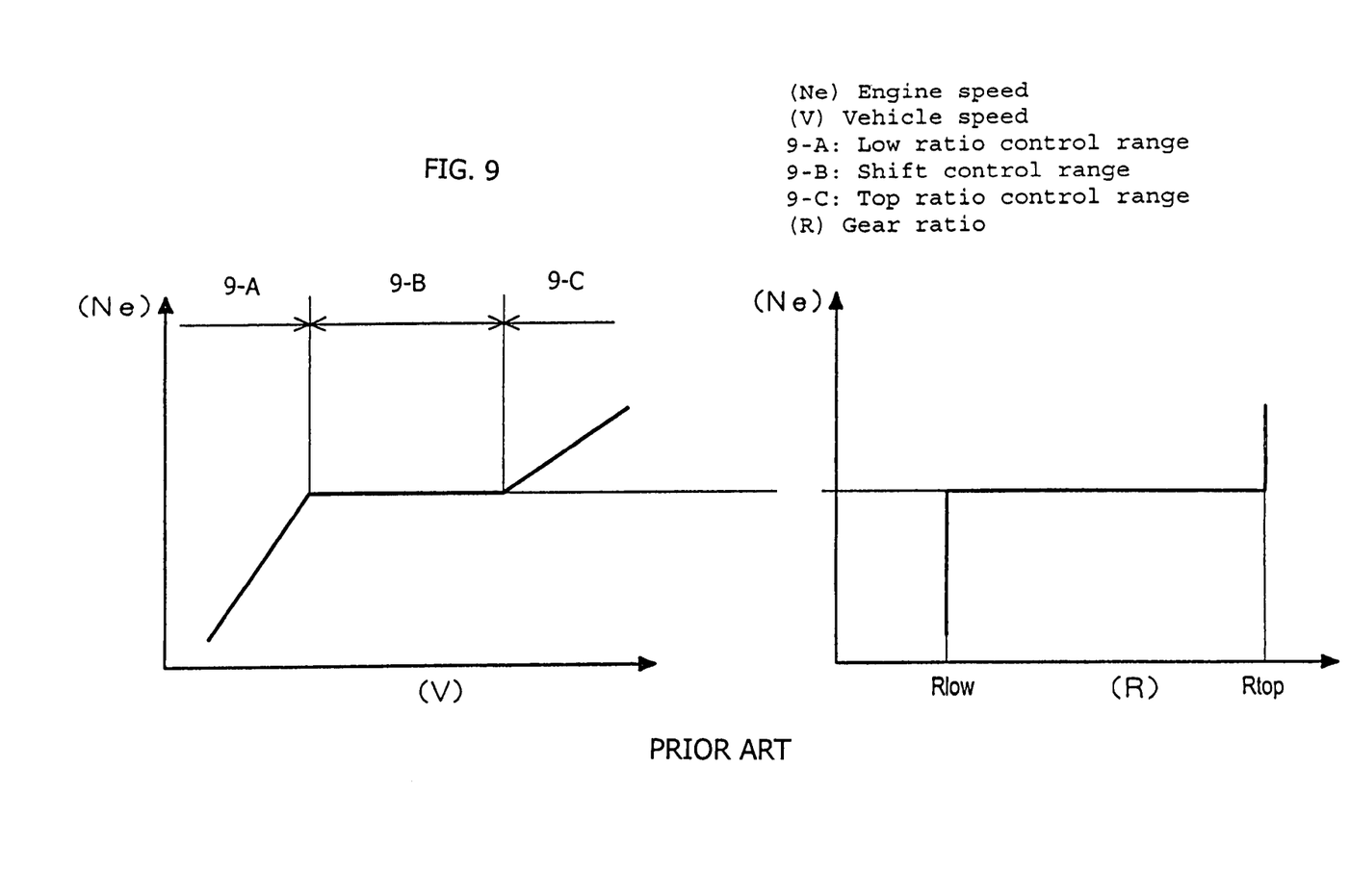
FIG. 9 is a diagram showing a prior art shift pattern.

FIG. 9 is a diagram showing a typical shift pattern of a conventional electronic belt converter. The relation among an engine speed Ne, a vehicle speed V, and a gear ratio R of the continuously variable transmission has been previously registered. The shift pattern includes a low ratio control range, a top ratio control range, and a shift control range. In the low ratio control range, the engine speed Ne is variably controlled at a low speed range with the gear ratio R set at a predetermined low ratio Rlow. In the top ratio control range, the engine speed Ne is variably controlled at a high-speed range with the gear ratio R set at a predetermined top ratio Rtop. In the shift control range, the gear ratio is variably controlled with the engine speed Ne fixed at a boundary between the low speed range and the high-speed range.

There is known a system, in which power of an engine is used to drive a generator for generating electricity which, in turn, is used to charge a battery. In such a system, the more a charging current, as a result of an amount of charge still available for use in the battery or a remaining charge of the battery, the greater a driving torque for the generator. This results in the engine mechanical load increasing. Thus, a rider is required to operate the vehicle with a relatively open throttle. Therefore, to obtain running performance equivalent to that associated with a sufficient remaining charge of the battery when the remaining charge of the battery is low, a rider needs to operate the vehicle with the throttle even more open. This gives the rider an impression different from that during ordinary operation. Consequently, there is still a need for a control apparatus for a continuously variable transmission that does not give the operator the above-mentioned different impression.

SUMMARY OF THE INVENTION

The present invention provides a shift controller for a continuously variable transmission ensuring an operating feel similar to that during ordinary running regardless of the remaining charge of the battery.

A shift control apparatus for a continuously variable transmission includes: a continuously variable transmission for transmitting power of an engine to a driving wheel; a shift actuator for changing a gear ratio of the continuously variable transmission; and a gear ratio controller for controlling the shift actuator such that the gear ratio of the continuously variable transmission exhibits a predetermined shift pattern.

According to a first aspect of the present invention, the shift controller further includes a battery monitor for detecting remaining charge of a battery charged by a generator connected to the engine, and the shift pattern is changed according to the remaining charge of the battery.

When the remaining charge of the battery is insufficient, if the gear ratio is shifted to a lower ratio side than when the remaining charge of the battery is sufficient, insufficient torque of the engine is supplemented with the gear ratio. This occurs even if a driving torque of the generator increases as a result of an insufficient remaining charge of the battery, and a mechanical load on the engine becomes greater. This gives the rider the same operating feel as that which occurs during ordinary running.

According to a second aspect of the present invention, the lower the remaining charge of the battery, the lower the gear ratio is selected. Insufficient torque of the engine is supplemented by adjustment of the gear ratio even if a driving torque of the generator increases as a result of an insufficient remaining charge of the battery, and a mechanical load on the engine becomes greater. This gives the rider the same operating feel as that which occurs during ordinary running.

According to a third aspect of the present invention, the shift control apparatus for the continuously variable transmission is characterized in that the shift pattern includes: a low ratio control range, in which an engine speed is variably controlled at a low speed range with the gear ratio set at a predetermined low ratio; a top ratio control range, in which the engine speed is variably controlled at a high speed range with the gear ratio set at a predetermined top ratio; and a shift control range, in which the gear ratio is variably controlled with the engine speed fixed at a boundary between the low speed range and the high speed range. In the shift control apparatus, the lower the remaining charge of the battery, the more the low ratio control range is expanded to the high speed range of the engine. As a result, the gear ratio in the shift control range is shifted on a low end. This gives the rider the same operating feel as that during ordinary running regardless of the remaining charge of the battery, particularly in the medium speed running range.

In a fourth aspect of the present invention, the shift pattern includes: a low ratio control range, in which an engine speed is variably controlled at a low speed range with the gear ratio set at a predetermined low ratio; a top ratio control range, in which the engine speed is variably controlled at a high speed range with the gear ratio set at a predetermined top ratio; and a shift control range, in which the gear ratio is variably controlled with the engine speed fixed at a boundary between the low speed range and the high speed range. In the shift control apparatus, the lower the remaining charge of the battery, the more the gear ratio of the low ratio control range is shifted to a low ratio side. Accordingly, in the low speed running range, when the remaining charge of the battery is insufficient the gear ratio can be made lower than the gear ratio when the remaining charge of the battery is sufficient. This gives the rider the same operating feel as that during ordinary running regardless of the remaining charge of the battery particularly in the low speed running range.

According to a fifth aspect of the present invention, the shift pattern includes: a low ratio control range, in which an engine speed is variably controlled at a low speed range with the gear ratio set at a predetermined low ratio; a top ratio control range, in which the engine speed is variably controlled at a high speed range with the gear ratio set at a predetermined top ratio; and a shift control range, in which the gear ratio is variably controlled with the engine speed fixed at a boundary between the low speed range and the high speed range; and that the lower the remaining charge of the battery, the more the gear ratio of the low ratio control range is shifted to a low ratio side, and the more the low ratio control range is expanded to the high speed range of the engine. In the shift apparatus, the lower the remaining charge of the battery, the more the gear ratio of the low ratio control range is shifted to a low ratio side, and the more the low ratio control range is expanded to the high speed range of the engine. Accordingly, in the low speed and medium speed running range, the gear ratio when the remaining charge of the battery is insufficient can be made lower than the gear ratio when the remaining charge of the battery is sufficient, giving the rider the same operating feel as that during ordinary running for both the low and medium speed running range.

According to a sixth aspect of the present invention, the continuously variable transmission is a belt type continuously variable transmission having an endless belt wound around a driving side pulley and a driven side pulley; and the shift actuator changes a belt winding diameter of at least either the driving side pulley or the driven side pulley. In an existing vehicle including a belt type continuously variable transmission and a shift actuator, simply changing a control system gives the rider the same operating feel as that during ordinary running regardless of the remaining charge of the battery.

According to a seventh aspect of the present invention, the shift pattern is not changed during running, even if the remaining charge of the battery becomes lower than a threshold value during running. There is, therefore, no likelihood that the running feel will be changed during running.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENTS

Figure 1:
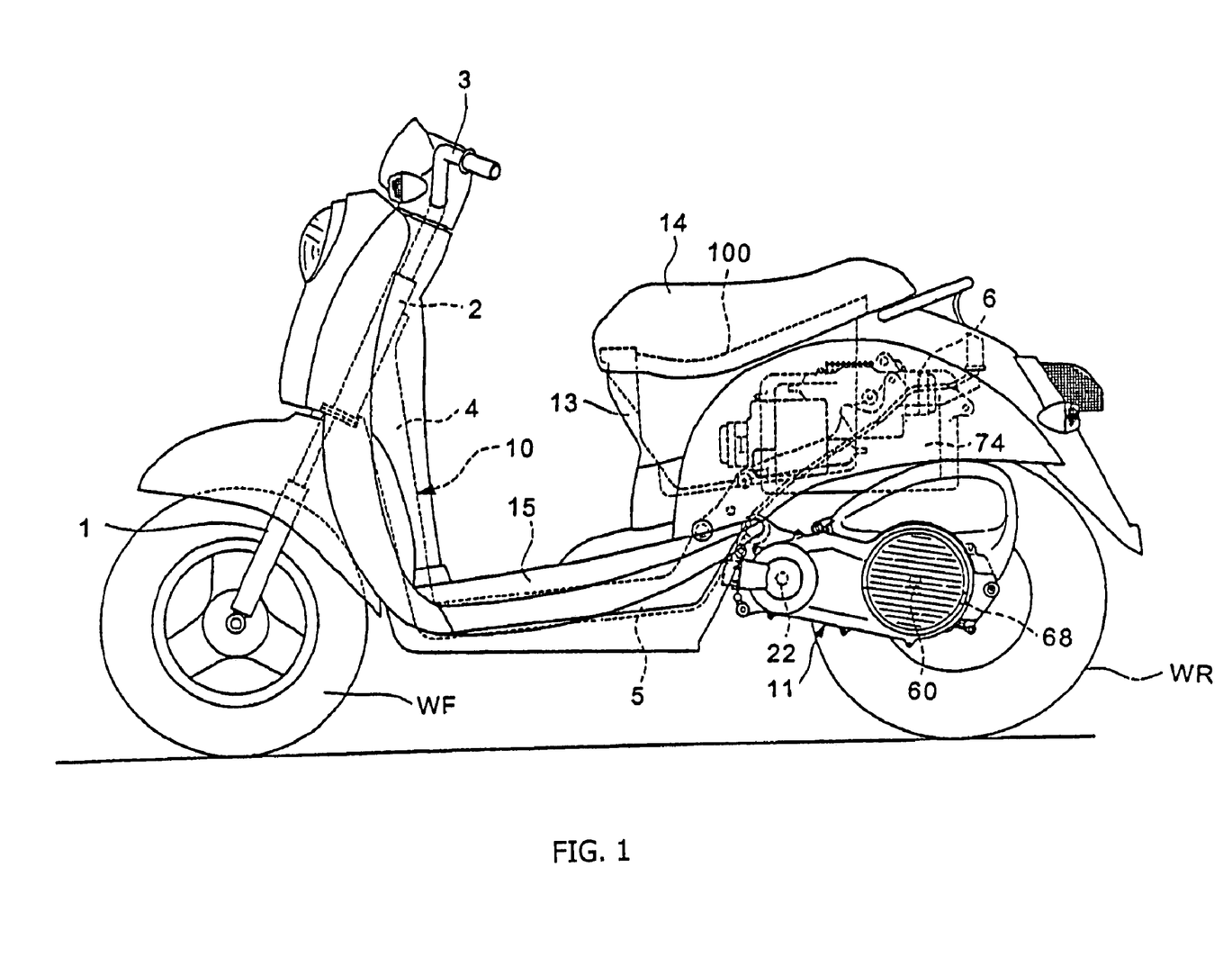
FIG. 1 is a side elevational view of a hybrid vehicle according to the present invention, showing a power unit including an engine and an electric drive motor operatively connected to the rear wheel.

A preferred embodiment of the present invention will be described in detail with reference to the accompanying drawings. FIG. 1 is a side elevational view showing a scooter-type hybrid vehicle according to a preferred embodiment of the present invention.

The hybrid vehicle according to the preferred embodiment of the present invention includes a front fork 1 for journaling a front wheel WF at a point forward of a vehicle body. The front fork 1 is pivotally supported on a head pipe 2. The front fork 1 can be steered through operation of a handlebar 3. A down pipe 4 is fitted to the head pipe 2 so as to extend rearwardly and downwardly therefrom. An intermediate frame 5 is extended substantially horizontally from a lower end of the down pipe 4. A rear portion frame 6 is formed rearwardly and upwardly from a trailing end of the intermediate frame 5.

A vehicle body frame 10 as constructed above includes a power unit 11 including an engine and a driving motor as a power source. One end of the power unit 11 is pivotally secured to the vehicle body frame 10. A rear wheel WR, functioning as a driving wheel, is rotatably mounted rearward and on the other end of the power unit 11. The power unit 11 is suspended by a rear shock absorber (not shown) mounted on the rear portion frame 6.

A vehicle body cover 13 covers the outer periphery of the vehicle body frame 10. A seat 14, on which a rider sits, is secured rearward and on a top surface of the vehicle body cover 13. A step floor 15, on which the rider rests his or her feet, is formed forward of the seat 14. A storage box 100 is disposed below the seat 14. The storage box 100 functions as a utility space for storing a helmet, luggage, and the like.

Figure 2:
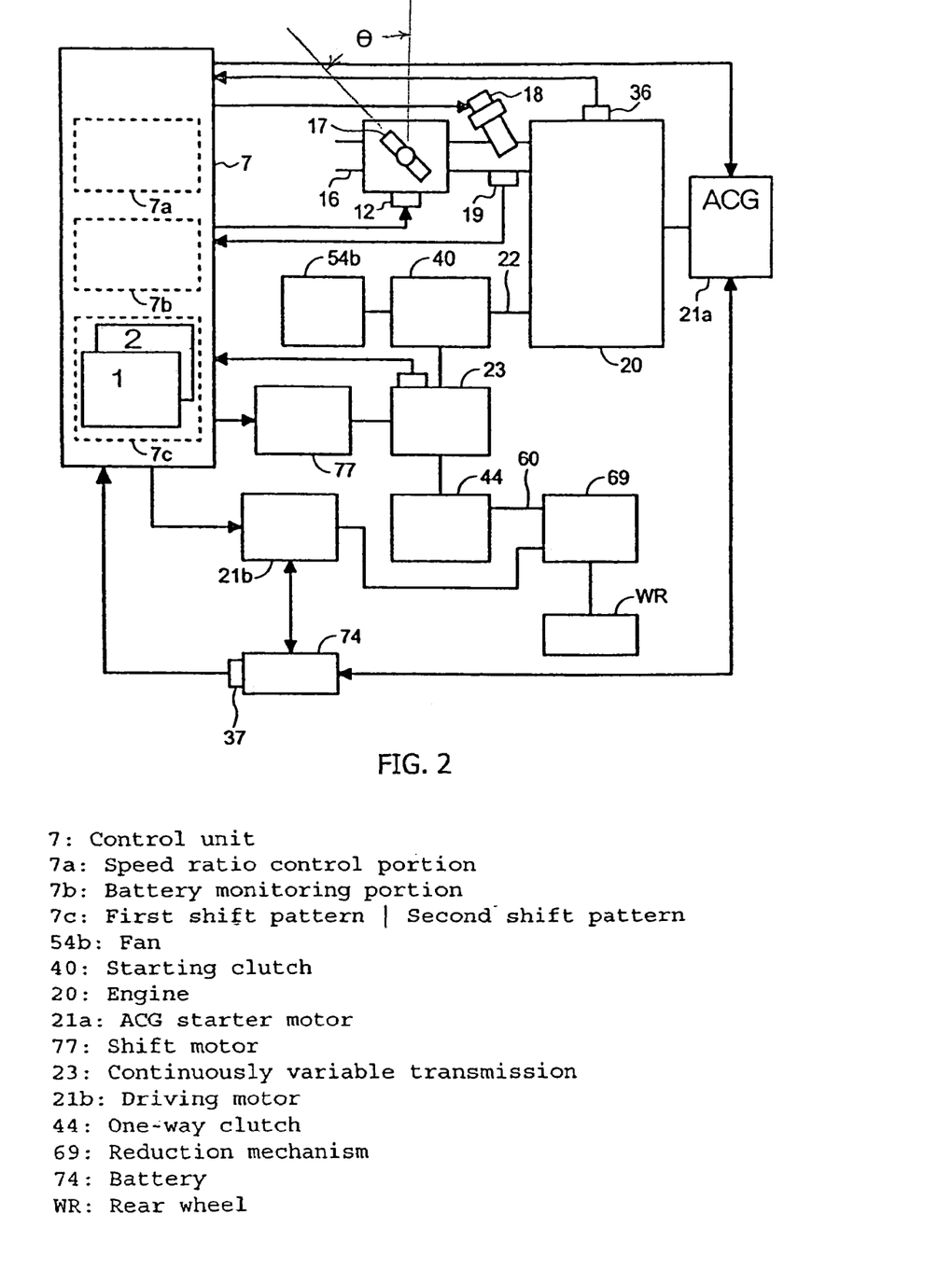
FIG. 2 is a block diagram of the system configuration of the motorcycle shown in FIG. 1.

FIG. 2 is a block diagram showing a system configuration of the hybrid vehicle described above. The power unit 11 includes an engine 20, an ACG starter motor 21a, a continuously variable transmission (transmission power mechanism) 23, a shift motor 77, a starting clutch 40, a driving motor 21b, a one-way clutch 44, and a reduction mechanism 69. Specifically, the ACG starter motor 21a functions as an engine starter and generator. The continuously variable transmission 23 is connected to a crankshaft 22 and transmits power of the engine 20 to the rear wheel WR. The shift motor 77 serves as a shift actuator that changes a shift position of the continuously variable transmission 23. The starting clutch 40 connects or disconnects transmission power between the crankshaft 22 and an input shaft of the continuously variable transmission 23. The driving motor 21b functions as a motor or a generator. The one-way clutch 44 transmits power from the engine 20 and the driving motor 21b to the rear wheel WR, but not from the rear wheel WR to the engine 20. The reduction mechanism 69 transmits an output from the continuously variable transmission 23 at a reduced speed to the rear wheel WR. An engine speed sensor 36 detects an engine speed Ne of the engine 20.

Power from the engine 20 is transmitted from the crankshaft 22 to the rear wheel WR via the starting clutch 40, the continuously variable transmission 23, the one-way clutch 44, a driving shaft 60, and the reduction mechanism 69. Power from the driving motor 21b, on the other hand, is transmitted to the rear wheel WR via the driving shaft 60 and the reduction mechanism 69. That is, according to the preferred embodiment of the present invention, the driving shaft 60 serves as an output shaft of the driving motor 21b.

A battery 74 is connected to the ACG starter motor 21a and the driving motor 21b. When the driving motor 21b functions as a motor, and when the ACG starter motor 21a functions as a starter, the battery 74 supplies power to the ACG starter motor 21a and the driving motor 21b. When the ACG starter motor 21a and the driving motor 21b function as a generator, the battery 74 is recharged by regenerative power generated by the ACG starter motor 21a and the driving motor 21b. A voltage sensor 37 detects a terminal data Vbat of the battery 74.

A throttle valve 17, for controlling the amount of intake air, is rotatably mounted in an intake pipe 16 of the engine 20. The throttle valve 17 is rotated according to the amount of operation of a throttle grip (not shown) operated by the rider. The shift controller according to the preferred embodiment of the present invention may include a DBW (drive-by-wire) system 12. The throttle valve 17 can thereby be automatically controlled according to the engine speed, a vehicle speed, and the like, irrespective of the operation performed by the rider. An injector 18 and a vacuum sensor 19 are disposed between the throttle Valve 17 and the engine 20. The injector 18 injects fuel. The vacuum sensor 19 detects a negative pressure in the intake pipe.

A control unit 7 includes a gear ratio control portion 7a, a battery monitoring portion 7b, and a shift pattern registration portion 7c. The gear ratio control portion 7a controls the shift motor 77 such that the gear ratio of the continuously variable transmission 23 exhibits a predetermined shift pattern. The battery monitoring portion 7b determines a charge state of the battery 74 based on the battery voltage Vbat detected by the voltage sensor 37. The shift pattern registration portion 7c stores the shift pattern of the continuously variable transmission 23 previously registered therein.

Figure 3:
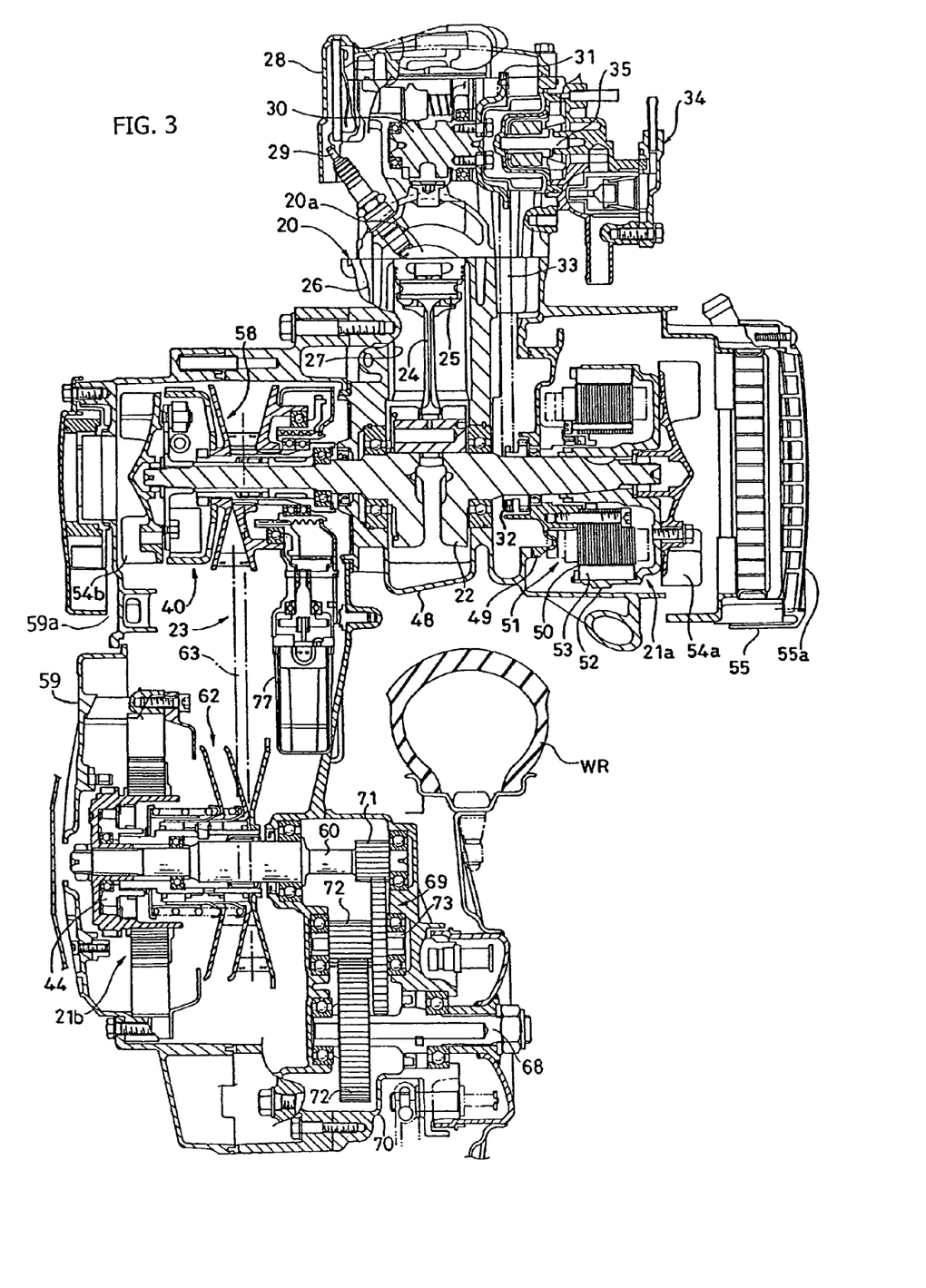
FIG. 3 is a cross sectional view of the power unit of the motorcycle shown in FIG. 1 showing the engine above the rear wheel, and the drive motor to one side of the rear wheel.

The construction of the power unit 11 including the engine 20 and the driving motor 21b will be described with reference to FIG. 3.

The engine 20 includes a piston 25 connected to the crankshaft 22 via a connecting rod 24. The piston 25 can slide inside a cylinder 27 disposed in a cylinder block 26. The cylinder block 26 is disposed such that an axis of the cylinder 27 runs substantially horizontally. A cylinder head 28 is secured to the front surface of the cylinder block 26. The cylinder head 28, the cylinder 27, and the piston 25 constitute a combustion chamber 20a for burning an air-fuel mixture.

The cylinder head 28 includes a valve (not shown) for controlling intake or exhaust of the air-fuel mixture to and from the combustion chamber 20a, and a spark plug 29. Opening or closing of the valve is controlled through rotation of a camshaft 30 journaled on the cylinder head 28. A driven sprocket 31 is mounted on one end of the camshaft 30. An endless cam chain 33 is wound around the driven sprocket 31 and a drive sprocket 32 disposed on one end of the crankshaft 22. A water pump 34 for cooling the engine 20 is mounted on the one end of the camshaft 30 such that a rotational axis 35 of the water pump 34 rotates integrally with the camshaft 30. Accordingly, rotating the camshaft 30 operates the water pump 34.

A stator case 49 is connected on the right-hand side in a vehicle width direction of a crankcase 48 that journals the crankshaft 22. The ACG starter motor 21a is housed in the stator case 49. The ACG starter motor 21a is what is called an outer rotor type. A stator of the ACG starter motor 21a includes a coil 51, which is a conductive wire wound around teeth 50 secured to the stator case 49. An outer rotor 52 is, on the other hand, secured to the crankshaft 22. The outer rotor 52 is of a substantially cylindrical shape covering the outer periphery of the stator. A magnet 53 is disposed on an inner peripheral surface of the outer rotor 52.

The outer rotor 52 includes a fan 54a for cooling the ACG starter motor 21a. When the fan 54a rotates in synchronism with the crankshaft 22, cooling air is drawn-in through a cooling air intake port formed in a side surface 55a of a cover 55 of the stator case 49. The cooling air is drawn-in in this manner.

A transmission case 59 is connected to the left-hand side, in the vehicle width direction, of the crankcase 48. A fan 54b, the continuously variable transmission 23, and the driving motor 21b are housed in the transmission case 59. The fan 54b is secured to a left end portion of the crankshaft 22. The driving side of the continuously variable transmission 23 is connected to the crankshaft 22 via the starting clutch 40. The driving motor 21b is connected to a driven side of the continuously variable transmission 23. The fan 54b functions to cool the continuously variable transmission 23 and the driving motor 21b, housed in the transmission case 59. The fan 54b is disposed on the same side as the driving motor 21b relative to the continuously variable transmission 23, that is, on the left-hand side in the vehicle width direction.

A cooling air intake port 59a is formed forward and on the left of the vehicle body of the transmission case 59. When the fan 54b rotates in synchronism with the crankshaft 22, an outside air is drawn in through the cooling air intake port 59a located near the fan 54b. The driving motor 21b and the continuously variable transmission 23 are forcedly cooled by the outside air thus drawn in.

The continuously variable transmission 23 is a belt converter including a driving side transmission pulley 58 and a driven side transmission pulley 62 with an endless V-belt (endless belt) 63 wound therearound. The driving side transmission pulley 58 is mounted via the starting clutch 40 at a left end portion of the crankshaft 22 protruding in the vehicle width direction from the crankcase 48. The driven side transmission pulley 62 is mounted via the one-way clutch 44 on the driving shaft 60 journaled with an axis running parallel with the crankshaft 22 on the transmission case 59.

Figure 4:
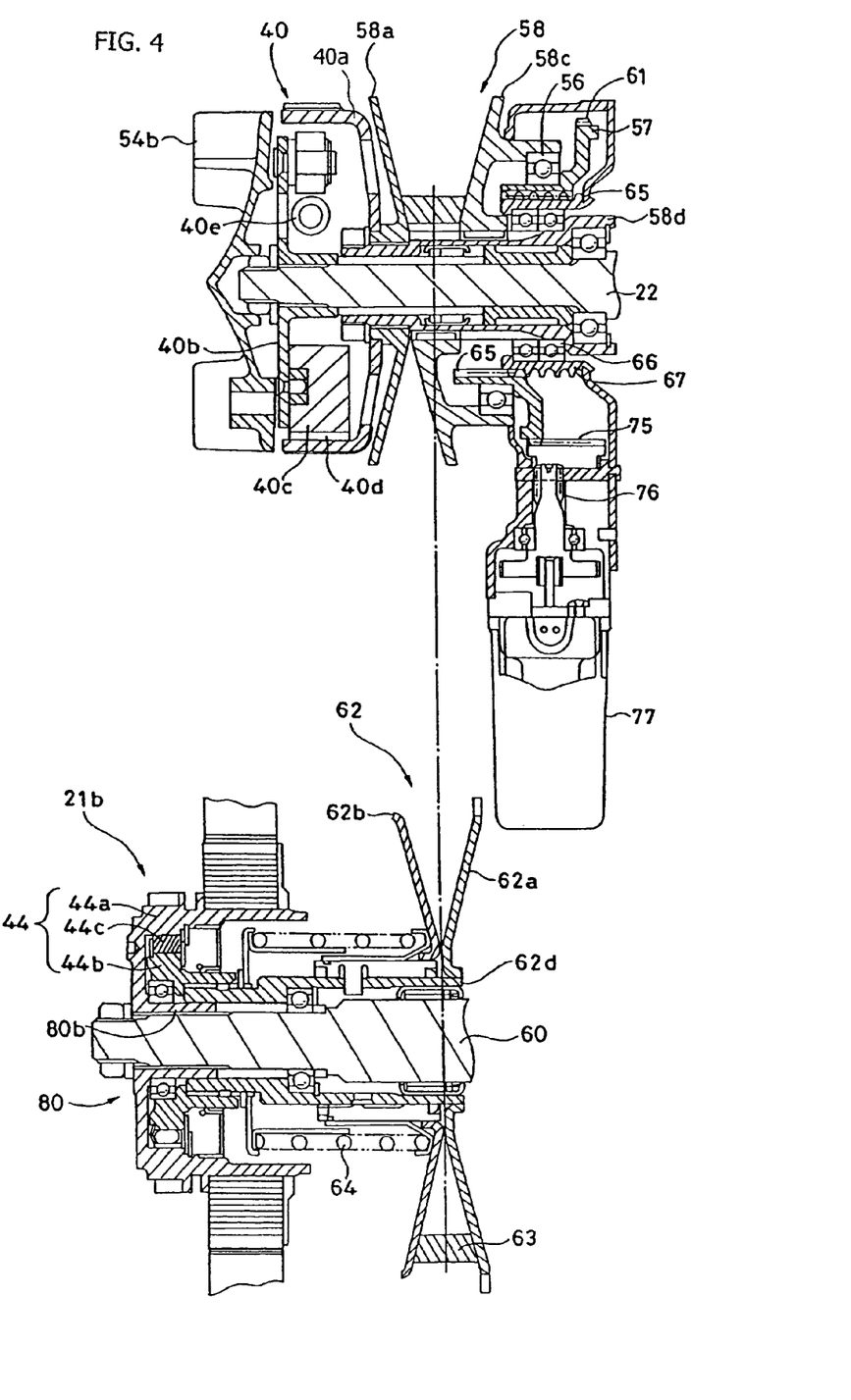
FIG. 4 is an enlarged view of the shift motor and drive motor of the power unit shown in FIG. 3.

Referring to FIG. 4 that is an enlarged view of the starting clutch 40, the shift motor 77, and the driving motor 21b, the driving side transmission pulley 58 is circumferentially rotatably mounted on the crankshaft 22 via a sleeve 58d. The driving side transmission pulley 58 includes a driving side fixed pulley half 58a and a driving side movable pulley half 58c. The driving side fixed pulley half 58a is fixed to the sleeve 58d. The driving side movable pulley half 58c is mounted on the sleeve 58d such that the pulley half 58c is axially slidable, but unable to make a circumferential rotation relative to the sleeve 58d. A shift ring 57 is rotatably mounted via a bearing 56 to the driving side movable pulley half 58c.

The shift ring 57 includes a gear 61 formed circumferentially on an outer peripheral large diameter portion thereof. The shift ring 57 also includes a trapezoidal screw 65 formed axially on an inner periphery thereof. Another trapezoidal screw 67 meshes with the trapezoidal screw 65. The trapezoidal screw 67 is mounted so as to be circumferentially rotatable relative to the sleeve 58d via a bearing 66, but unable to slide axially.

A worm wheel 75 meshes with the gear 61 of the shift ring 57. Further, a worm gear 76 meshes with the worm wheel 75. The worm gear 76 is connected to a rotational axis of a shift motor 77 for controlling the gear ratio.

The driven side transmission pulley 62, on the other hand, includes a driven side fixed pulley half 62a and a driven side movable pulley half 62b. The driven side fixed pulley half 62a is circumferentially rotatably mounted on the driving shaft 60 via a sleeve 62d, while being restricted in its axial sliding motion relative to the driving shaft 60. The driven side movable pulley half 62b is axially slidably mounted on the sleeve 62d.

An endless V belt 63 is wound around each of belt grooves having substantially a V-shaped cross section formed between the driving side fixed pulley half 58a and the driving side movable pulley half 58c, and between the driven side fixed pulley half 62a and the driven side movable pulley half 62b.

A spring (elastic member) 64 is disposed on the backside (on the left-hand side in the vehicle width direction) of the driven side movable pulley half 62b. The spring 64 urges the driven side movable pulley half 62b toward the driven side fixed pulley half 62a at all times.

When the gear ratio of the automatic continuously variable transmission 23 is to be changed, the shift motor 77 is driven in a direction of rotation corresponding to an upshift or downshift of the gear ratio. The driving force of the shift motor 77 is transmitted to the gear 61 of the shift ring 57 through the worm gear 76 and the worm wheel 75. The shift ring 57 is thereby rotated. Since the shift ring 57 is in mesh with the sleeve 57d through the trapezoidal screws 65, 67, the shift ring 57 moves to the left along the crankshaft 22, as shown in FIG. 4. This results in the driving side movable pulley half 58c sliding toward the side of the driving side fixed pulley half 58a. The driving side movable pulley half 58c then comes closer to the driving side fixed pulley half 58a by the amount of this sliding motion. This decreases a groove width of the driving side transmission pulley 58. A position of contact between the driving side transmission pulley 58 and the V belt 63 is then deviated radially outwardly along the driving side transmission pulley 58, causing the winding diameter of the V belt 63 to increase. This results in the following occurring in the driven side transmission pulley 62. Specifically, a groove width formed by the driven side fixed pulley half 62a and the driven side movable pulley half 62b increases. That is, the winding diameter of the V belt 63 (a transmission pitch diameter) continuously varies according to the speed of the crankshaft 22. This results in the gear ratio being automatically and steplessly varied.

The starting clutch 40 includes an outer case 40a, an outer plate 40b, a weight 40c, a shoe 40d, and a spring 40e. The outer case 40a of a cup shape is fixed to the sleeve 58d. The outer plate 40b is fixed on a left end portion of the crankshaft 22. The shoe 40d is mounted on an outer peripheral portion of the outer plate 40b via the weight 40c so as to face radially outwardly. The spring 40e urges the shoe 40d radially inwardly.

When the engine speed, or the speed of the crankshaft 22 is equal to, or less than, a predetermined value (e.g., 3000 rpm), transmission power between the crankshaft 22 and the continuously variable transmission 23 is disconnected through the starting clutch 40. As the engine speed increases and the speed of the crankshaft 22 exceeds the predetermined value, the centrifugal force acting on the weight 40c counteracts an elastic force acting radially inwardly by the spring 40e, moving the weight 40c radially outwardly. This causes the shoe 40d to press an inner peripheral surface of the outer case 40a with a force of a predetermined value or more. This causes rotation of the crankshaft 22 to be transmitted to the sleeve 58d via the outer case 40a. The driving side transmission pulley 58 fixed to the sleeve 58d is thereby driven.

The one-way clutch 44 includes an outer clutch 44a, an inner clutch 44b, and a roller 44c. The outer clutch 44a is of a cup shape. The inner clutch 44b is internally inserted in the outer clutch coaxially therewith. The roller 44c allows power to be transmitted in one direction only from the inner clutch 44b to the outer clutch 44a. The outer clutch 44a serves also as an inner rotor main body for the driving motor 21b. The outer clutch 44a is formed of the same member as the inner rotor main body.

Power from the side of the engine 20 transmitted to the driven side transmission pulley 62 of the continuously variable transmission 23 is transmitted to the rear wheel WR by way of the driven side fixed pulley half 62a, the inner clutch 44b, the outer clutch 44a or the inner rotor main body, the driving shaft 60, and the reduction mechanism 69. Power from the side of the rear wheel WR generated as the vehicle is pulled by walking, during regenerative operation, or the like, on the other hand, is transmitted to the reduction mechanism 69, the driving shaft 60, and the inner rotor main body or the outer clutch 44a. The power generated in the latter case is not, however, transmitted to the continuously variable transmission 23 and the engine 20, since the outer clutch 44a turns idly relative to the inner clutch 44b.

The driving motor 21b of an inner rotor type is disposed rearward of the transmission case 59. The driving motor 21b uses the driving shaft 60 as its output shaft. An inner rotor 80 includes the driving shaft 60, an inner rotor main body or the inner clutch 44b, and a magnet. The driving shaft 60 serves also as an output shaft for the continuously variable transmission 23. The inner clutch 44b is in splined engagement with the driving shaft 60 by a cup-shaped boss portion 80b formed at a central portion thereof. The magnet is disposed on an outer peripheral surface on an open side of the inner clutch 44b.

Referring back to FIG. 3, the reduction mechanism 69 is disposed in a transmission chamber 70 that continues to the right-hand side at a trailing end portion of the transmission case 59. The reduction mechanism 69 includes an intermediate shaft 73 that is journaled in parallel with the driving shaft 60 and an axle 68 of the rear wheel WR. The reduction mechanism 69 further includes a pair of first reduction gears 71 and a pair of second reduction gears 72. The first reduction gears 71 are formed on the right end portion of the driving shaft 60 and a central portion of the intermediate shaft 73, respectively. The second reduction gears 72 are formed on the intermediate shaft 73 and the left end portion of the axle 68, respectively. Through such an arrangement, the speed of rotation of the driving shaft 60 is reduced at a predetermined reduction ratio. Rotation of the driving shaft 60 is then transmitted to the axle 68 of the rear wheel WR that is journaled in parallel with the driving shaft 60.

In the hybrid vehicle having the arrangements as described in the foregoing, the ACG starter motor 21a mounted on the crankshaft 22 is used to turn the crankshaft 22 when the engine is to be started. At this time, the starting clutch 40 is not engaged, meaning that transmission power from the crankshaft 22 to the continuously variable transmission 23 is shut off.

When the throttle grip is operated and opened, only the driving motor 21b provides power as long as a throttle opening θ remains small according to the preferred embodiment of the present invention. Rotation of the driving shaft 60 through the driving motor 21b is not transmitted to the driven side transmission pulley 62 through the functioning of the one-way clutch 44. The continuously variable transmission 23 can then never be driven. Accordingly, running the vehicle by driving the rear wheel WR only with the driving motor 21b enhances energy transmission efficiency.

As the throttle opening θ is made greater, the engine speed increases. When the speed of the crankshaft 22 thereafter exceeds a predetermined value (e.g., 3000 rpm), the rotational power of the crankshaft 22 is transmitted to the continuously variable transmission 23 through the starting clutch 40 and applied to the one-way clutch 44. When the speed on an input side of the one-way clutch 44 coincides with the speed on an output side thereof, that is, the driving shaft 60, power is switched from the driving motor 21b to the engine 20.

Figure 5:
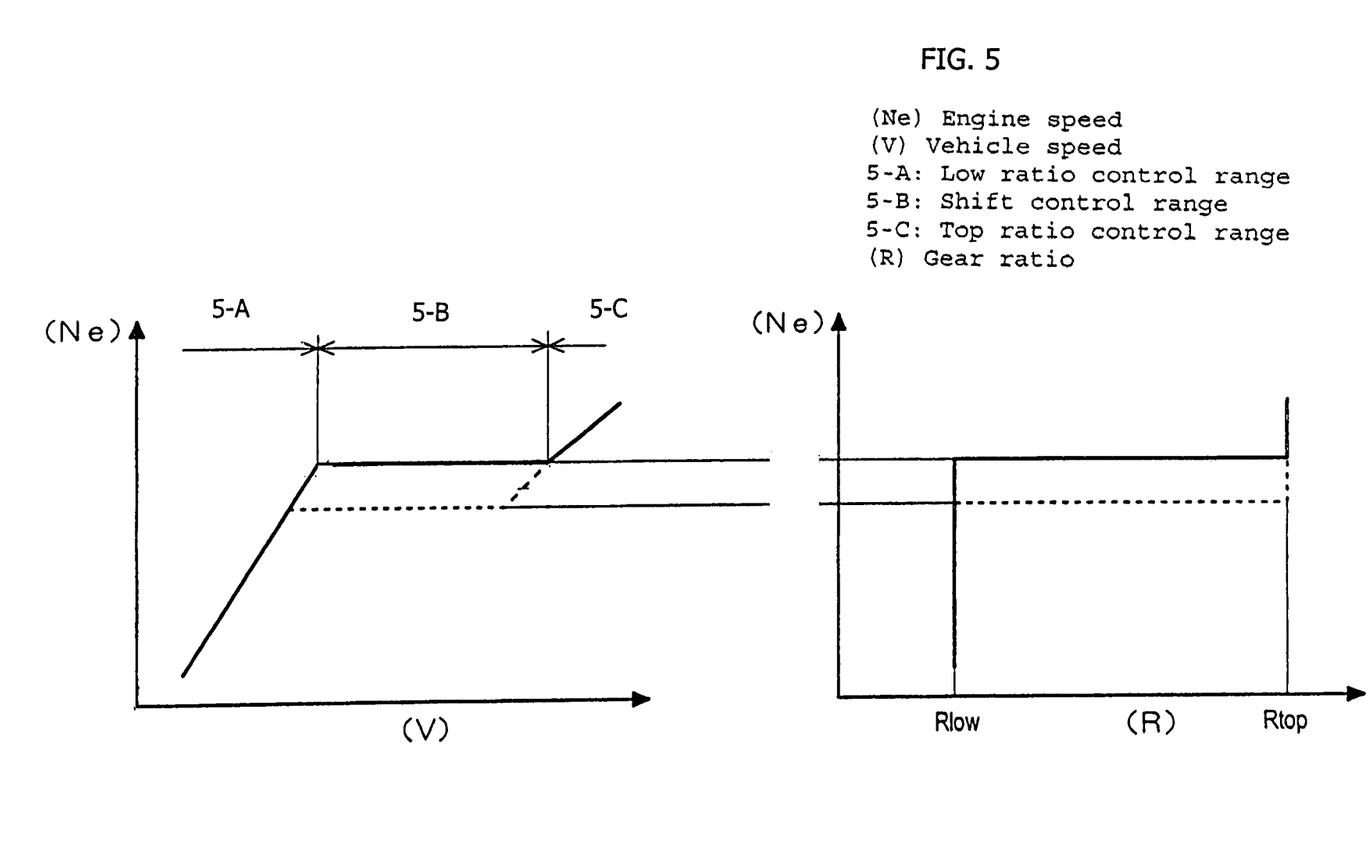
FIG. 5 is a diagram showing a shift pattern according to the first embodiment of the present invention in which a broken line represents a shift pattern (a first pattern) when the remaining charge of the battery is sufficient, while a solid line represents a shift pattern (a second pattern) when the remaining charge of the battery is insufficient.

FIG. 5 is a diagram showing a typical shift pattern according to the first preferred embodiment of the present invention. In FIG. 5, a broken line represents a shift pattern (a first pattern) when the remaining charge of the battery 74 is sufficient, while a solid line represents a shift pattern (a second pattern) when the remaining charge of the battery 74 is insufficient.

According to the first preferred embodiment of the present invention, if it is determined that the remaining charge of the battery is insufficient, a low ratio control range is expanded to include a high engine speed side. With an insufficient remaining charge of the battery 74, the gear ratio is thereby made lower than the gear ratio with a sufficient remaining charge of the battery 74, particularly in a medium speed running range.

Figure 6:
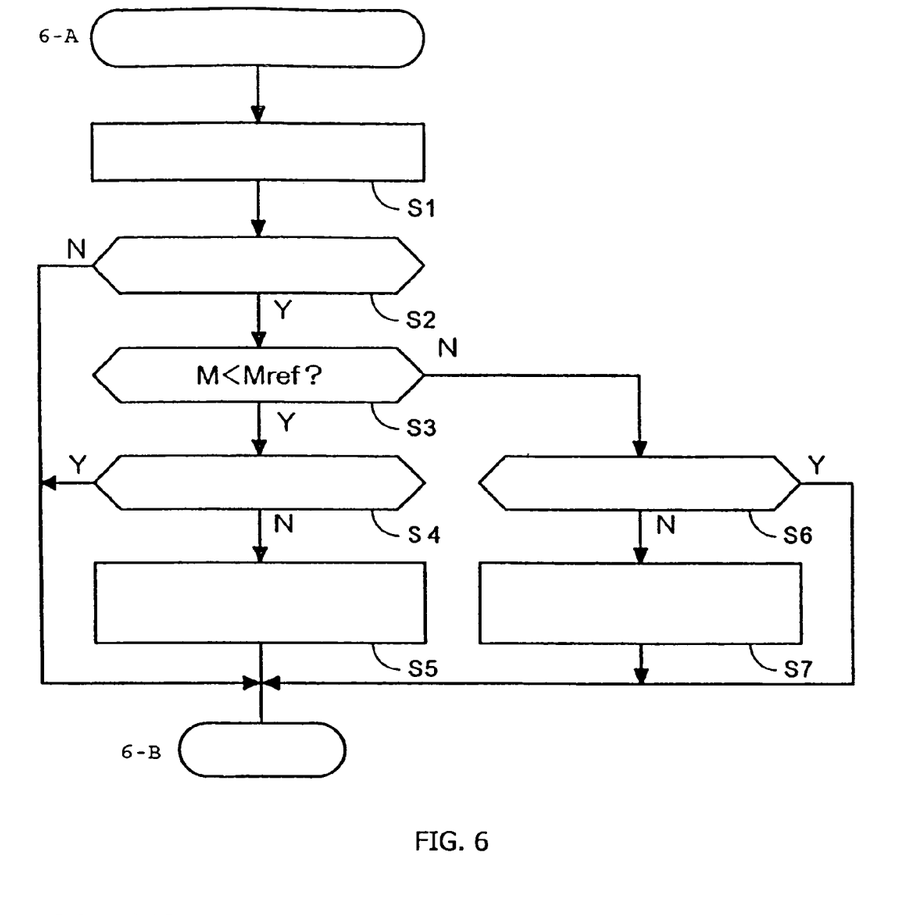
FIG. 6 is a flowchart showing shift pattern control processes.

FIG. 6 is a flowchart showing shift pattern control processes that change the shift pattern based on a remaining charge M of the battery 74. FIG. 6 mainly shows operations performed by the control unit 7.

In step S1, the battery monitoring portion 7b of the control unit 7 detects the remaining charge M of the battery 74 based on the battery voltage Vbat detected by the voltage sensor 37 or a record thereof. In step S2, it is determined whether the vehicle is in a stationary state based on, for example, a vehicle speed V.

If it is determined that the vehicle is in the stationary state, the control proceeds to step S3. In step S3, the remaining charge M of the battery 74 is compared with a reference remaining charge Mref that has previously been registered as a threshold value of changing the shift pattern. If the remaining charge M of the battery 74 is lower than the reference remaining charge Mref, the control proceeds to step S4. In step S4, it is determined that the current shift pattern is the first pattern (the shift pattern indicated by the broken line in FIG. 5) adopted when the remaining charge is sufficient or the second pattern (the shift pattern indicated by the solid line in FIG. 5) adopted when the remaining charge is insufficient. If the current pattern is one other than the second pattern, the control proceeds to step S5. In step S5, the shift pattern is changed from the current first pattern to the second pattern. Accordingly, following this step, the gear ratio is controlled according to the second pattern indicated by the solid line in FIG. 5.

If, in step S3, it is not determined that the remaining charge M of the battery 74 is lower than the reference remaining charge Mref, the control proceeds to step S6. In step S6, it is determined that the current shift pattern is either the first pattern or the second pattern. If the current pattern is one other than the first pattern, the control proceeds to step S7. In step S7, the shift pattern is changed from the current second pattern to the first pattern.

As described in the foregoing, according to the first preferred embodiment of the present invention, the shift pattern is changed from the first pattern to the second pattern as a result of the remaining charge M of the battery 74 decreasing. Even if this happens, if charging is thereafter promoted to allow the battery 74 to recover its charge, the shift pattern is returned from the second pattern to the first pattern. Accordingly, the gear ratio is hereafter controlled according to the first pattern indicated by the broken line in FIG. 5.

Figure 7:
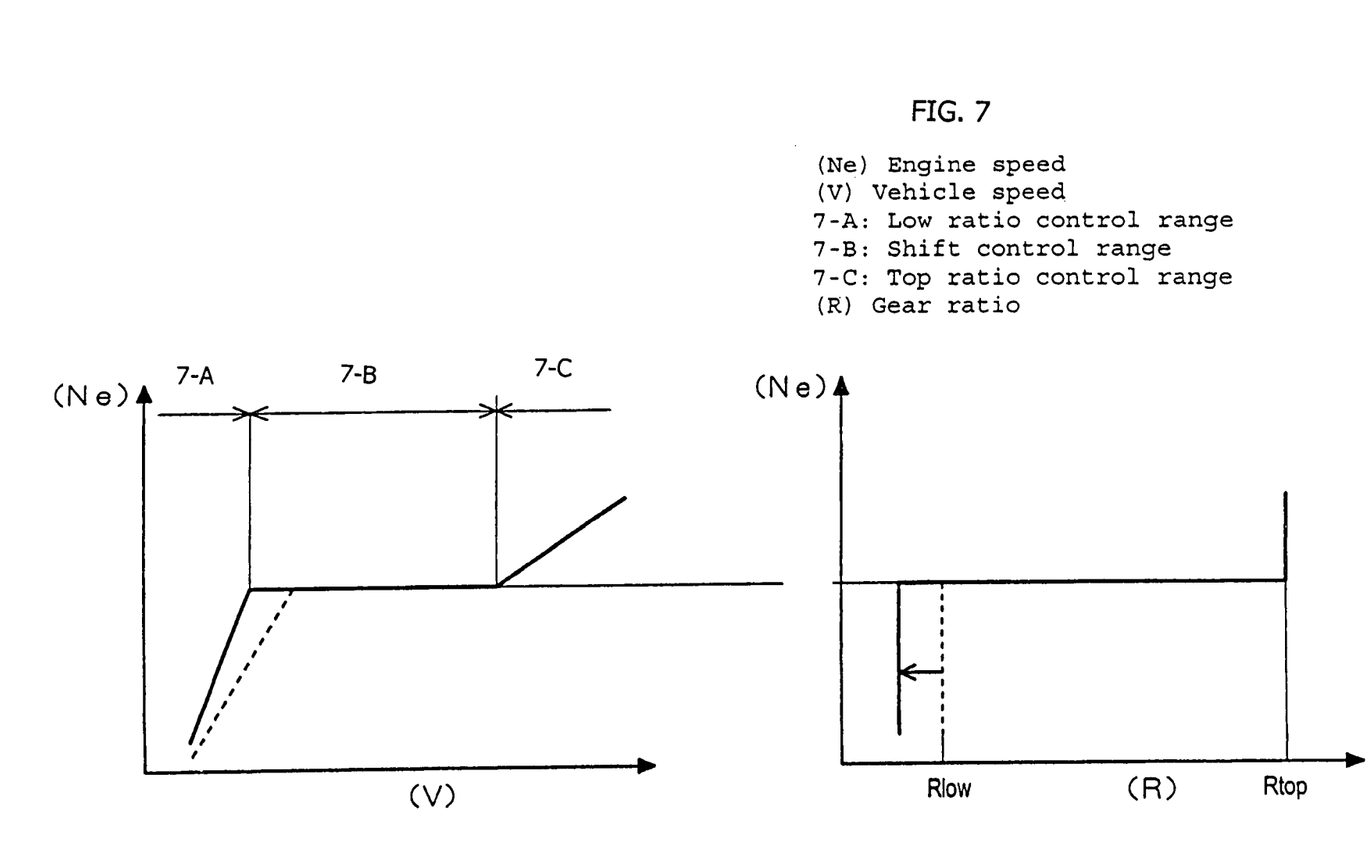
FIG. 7 is a diagram showing a shift pattern according to the second embodiment of the present invention in which a broken line represents a shift pattern (a first pattern) when the remaining charge of the battery is sufficient, while a solid line represents a shift pattern (a second pattern) when the remaining charge of the battery is insufficient.

FIG. 7 is a diagram showing a shift pattern according to a second preferred embodiment of the present invention. In FIG. 7, again, a broken line represents a shift pattern (a first pattern) when the remaining charge of the battery 74 is sufficient, while a solid line represents a shift pattern (a second pattern) when the remaining charge of the battery 74 is insufficient.

According to the second preferred embodiment of the present invention, if it is determined that the remaining charge M of the battery 74 is insufficient, a gear ratio in the low ratio control range Rlow is lowered further than the level when it is determined that the remaining charge M of the battery 74 is sufficient. The gear ratio when the remaining charge M of the battery 74 is insufficient is thus made to be lower than the gear ratio when the remaining charge M of the battery 74 is sufficient particularly in a low speed running range.

Figure 8:
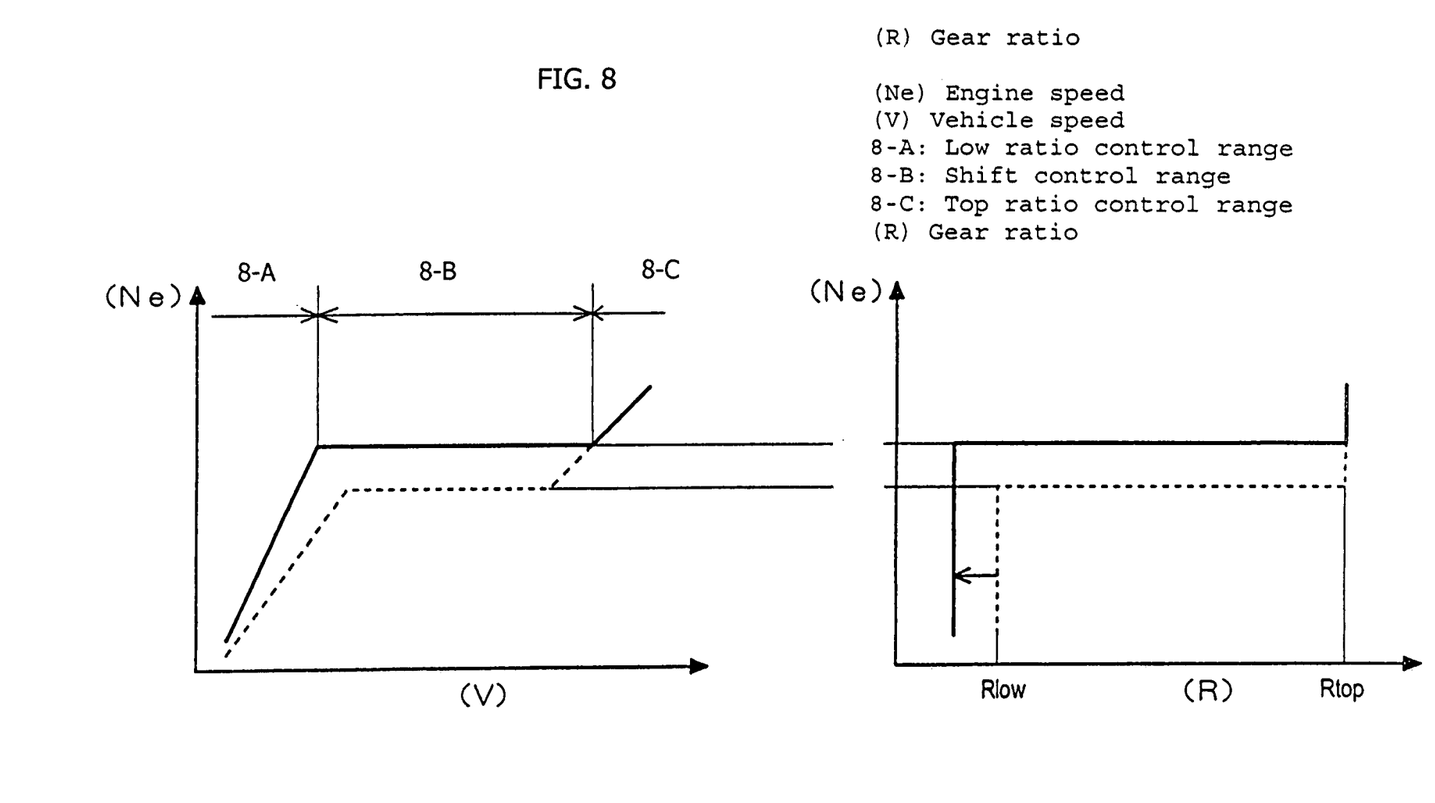
FIG. 8 is a diagram showing a shift pattern according to the third embodiment of the present invention in which a broken line represents a shift pattern (a first pattern) when the remaining charge of the battery is sufficient, while a solid line represents a shift pattern (a second pattern) when the remaining charge of the battery is insufficient.

FIG. 8 is a diagram showing a shift pattern according to a third preferred embodiment of the present invention. In FIG. 8, too, a broken line represents a shift pattern (a first pattern) when the remaining charge of the battery 74 is sufficient, while a solid line represents a shift pattern (a second pattern) when the remaining charge of the battery 74 is insufficient.

According to the third preferred embodiment of the present invention, the lower the remaining charge M of the battery 74, the more the gear ratio in the low ratio control range Rlow is shifted to the low ratio side as in the second preferred embodiment of the present invention. At the same time, the low ratio control range is expanded to include the high engine speed side as in the first preferred embodiment of the present invention. The gear ratio when the remaining charge M of the battery 74 is insufficient is thereby made to be lower than the gear ratio when the remaining charge M of the battery 74 is sufficient in both the low speed running range and the medium speed running range.

The present invention is not limited to the above embodiments in which the second shift pattern is selected when the remaining charge of the battery becomes insufficient. It is nonetheless appropriate that a plurality of shift patterns adopted according to the degree of insufficiency of the remaining charge of the battery is provided and the optimum shift pattern be adopted according to the remaining charge of the battery. An arrangement can thereby be made to control the shift pattern such that an even lower gear ratio can be selected when insufficiency of the remaining charge of the battery is serious.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having thus described the invention, what is claimed is:

1. A shift control apparatus for a continuously variable transmission, comprising:
   a continuously variable transmission for transmitting power of an engine to a driving wheel;
   a shift actuator for changing a gear ratio of the continuously variable transmission; and
   a gear ratio control device for controlling the shift actuator such that the gear ratio of the continuously variable transmission exhibits a predetermined shift pattern; wherein
   the shift control apparatus further includes a battery monitoring device for detecting remaining charge of a battery charged by a generator connected to the engine; and
   wherein the shift pattern is changed according to the remaining charge of the battery; and
   wherein the shift pattern does not change during running.

2. The shift control apparatus for the continuously variable transmission according to claim 1, wherein the shift pattern changes such that the more the battery lacks in the remaining charge, the lower the gear ratio.

3. The shift control apparatus for the continuously variable transmission according to claim 1, wherein the shift pattern includes:
   a low ratio control range, in which an engine speed is variably controlled at a low speed range with the gear ratio set at a predetermined low ratio;
   a top ratio control range, in which the engine speed is variably controlled at a high speed range with the gear ratio set at a predetermined top ratio; and
   a shift control range, in which the gear ratio is variably controlled with the engine speed fixed at a boundary between the low speed range and the high speed range; and
   wherein the lower the remaining charge of the battery, the more the low ratio control range is expanded to the high-speed range of the engine.

4. The shift control apparatus for the continuously variable transmission according to claim 1, wherein the shift pattern includes:
   a low ratio control range, in which an engine speed is variably controlled at a low speed range with the gear ratio set at a predetermined low ratio;
   a top ratio control range, in which the engine speed is variably controlled at a high speed range with the gear ratio set at a predetermined top ratio; and
   a shift control range, in which the gear ratio is variably controlled with the engine speed fixed at a boundary between the low speed range and the high speed range; and
   wherein the lower the remaining charge of the battery, the more the gear ratio of the low ratio control range is shifted to an even lower ratio side.

5. The shift control apparatus for the continuously variable transmission according to claim 1,
   wherein the shift pattern includes:
   a low ratio control range, in which an engine speed is variably controlled at a low speed range with the gear ratio set at a predetermined low ratio;
   a top ratio control range, in which the engine speed is variably controlled at a high speed range with the gear ratio set at a predetermined top ratio; and
   a shift control range, in which the gear ratio is variably controlled with the engine speed fixed at a boundary between the low speed range and the high speed range; and
   wherein the lower the remaining charge of the battery, the more the gear ratio of the low ratio control range is shifted to a low ratio side, and the more the low ratio control range is expanded to the high speed range of the engine.

6. The shift control apparatus for the continuously variable transmission according to claim 1, wherein the continuously variable transmission is a belt type continuously variable transmission having an endless belt wound around a driving side pulley and a driven side pulley; and
   wherein the shift actuator changes a belt winding diameter of at least either the driving side pulley or the driven side pulley.

7. In a hybrid vehicle comprising an engine and a drive motor, both the engine and the drive motor operatively connected to a drive wheel for driving the vehicle, the hybrid vehicle comprising:
   a generator connected to the engine,
   a battery charged by the generator for powering the drive motor, the improvement comprising a shift control apparatus for a continuously variable transmission, the shift control apparatus comprising:
   a continuously variable transmission for transmitting power of the engine to the driving wheel;
   a shift actuator for changing a gear ratio of the continuously variable transmission; and
   a gear ratio control device for controlling the shift actuator such that the gear ratio of the continuously variable transmission exhibits a predetermined shift pattern;
   wherein the shift control apparatus further includes a battery monitoring device for detecting remaining charge of the battery; and
   wherein the predetermined shift pattern is selected from among a plurality of predetermined shift patterns according to the remaining charge of the battery.

8. The hybrid vehicle according to claim 7,
   wherein the shift pattern changes such that the more the battery lacks in the remaining charge, the lower the gear ratio.

9. The hybrid vehicle according to claim 7,
   wherein the continuously variable transmission is a belt type continuously variable transmission having an endless belt wound around a driving side pulley and a driven side pulley; and wherein the shift actuator changes a belt winding diameter of at least either the driving side pulley or the driven side pulley.

10. The hybrid vehicle according to claim 7, wherein the shift pattern does not change during running.

11. A method of controlling a continuously variable transmission in a vehicle, the vehicle comprising:
an engine,
a continuously variable transmission for transmitting power of the engine to the driving wheel;
a generator connected to the engine,
a battery, and
a shift control apparatus for a controlling the continuously variable transmission, the shift control apparatus comprising:
a shift actuator for changing a gear ratio of the continuously variable transmission;
a gear ratio control device for controlling the shift actuator such that the gear ratio of the continuously variable transmission exhibits a predetermined shift pattern; and
a battery monitoring device for detecting remaining charge of the battery; the method steps comprising
detecting the remaining charge of the battery using the battery monitoring device,
selecting a shift pattern from among a plurality of predetermined shift patterns according to the remaining charge of the battery
actuating the shift actuator according to the selected shift pattern.

12. The method of controlling a continuously variable transmission of claim 11, wherein the gear ratio device controls the shift actuator such that the more the battery lacks in the remaining charge, the lower the gear ratio used.

13. The method of controlling a continuously variable transmission of claim 11,
wherein the shift pattern includes:
a low ratio control range, in which an engine speed is variably controlled at a low speed range with the gear ratio set at a predetermined low ratio;
a top ratio control range, in which the engine speed is variably controlled at a high speed range with the gear ratio set at a predetermined top ratio; and
a shift control range, in which the gear ratio is variably controlled with the engine speed fixed at a boundary between the low speed range and the high speed range; and
wherein the lower the remaining charge of the battery, the more the low ratio control range is expanded to the high-speed range of the engine.

14. The method of controlling a continuously variable transmission of claim 11,
wherein the shift pattern includes:
a low ratio control range, in which an engine speed is variably controlled at a low speed range with the gear ratio set at a predetermined low ratio;
a top ratio control range, in which the engine speed is variably controlled at a high speed range with the gear ratio set at a predetermined top ratio; and
a shift control range, in which the gear ratio is variably controlled with the engine speed fixed at a boundary between the low speed range and the high speed range; and
wherein the lower the remaining charge of the battery, the more the gear ratio of the low ratio control range is shifted to an even lower ratio side.

15. The method of controlling a continuously variable transmission of claim 11,
wherein the shift pattern includes:
a low ratio control range, in which an engine speed is variably controlled at a low speed range with the gear ratio set at a predetermined low ratio;
a top ratio control range, in which the engine speed is variably controlled at a high speed range with the gear ratio set at a predetermined top ratio; and
a shift control range, in which the gear ratio is variably controlled with the engine speed fixed at a boundary between the low speed range and the high speed range; and
wherein the lower the remaining charge of the battery, the more the gear ratio of the low ratio control range is shifted to a low ratio side, and the more the low ratio control range is expanded to the high speed range of the engine.

16. The method of controlling a continuously variable transmission of claim 11, wherein
a first shift pattern is provided corresponding to a battery having a charge equal to or greater than a predetermined reference battery charge, and
a second shift pattern is provided corresponding to a battery having a charge less than the predetermined reference battery charge,
wherein the following steps are performed in place of performing the step of selecting a shift pattern from among a plurality of predetermined shift patterns according to the remaining charge of the battery:
compare the detected remaining charge of the battery with the predetermined reference charge,
determine whether the vehicle is moving;
if the vehicle is moving, maintain the shift pattern that is being used,
if the vehicle is not moving, and the detected battery charge is equal to or greater than the predetermined reference charge, determine if the shift pattern being used corresponds to the second shift pattern,
if the shift pattern being used is not the second shift pattern, change the shift pattern from the first shift pattern to the second shift pattern,
if the vehicle is not moving, and the detected battery charge is less than the predetermined reference charge, determine if the shift pattern being used corresponds to the first shift pattern,
if the shift pattern being used is not the first shift pattern, change the shift pattern from the second shift pattern to the first shift pattern.

* * * * *